United States Patent

[11] 3,575,030

| [72] | Inventor | Karl F. Braeuninger |
| | | Ferguson, Mo. |
| [21] | Appl. No. | 679,836 |
| [22] | Filed | Nov. 1, 1967 |
| [45] | Patented | Apr. 13, 1971 |
| [73] | Assignee | The Dow Chemical Company |
| | | Midland, Mich. |

[54] SLANTED WELD EXTRUSION PROCESS
3 Claims, 6 Drawing Figs.

[52] U.S. Cl. .................................................. 72/269,
72/467
[51] Int. Cl. ........................................ B21c 25/04
[50] Field of Search .................................... 72/269,
468, 467; 207/5; 138/170, 171

[56] References Cited
UNITED STATES PATENTS

| 2,221,299 | 11/1940 | Jones | 72/467X |
| 2,366,344 | 1/1945 | McFadden | 72/269 |
| 2,859,869 | 11/1958 | Nolf | 72/467 |
| 2,730,135 | 1/1956 | Wallace | 138/171 |
| 2,025,666 | 12/1935 | Hanff | 138/142 |

*Primary Examiner*—Charles W. Lanham
*Assistant Examiner*—A. L. Havis
*Attorneys*—Griswold and Burdick, Edward E. Schilling and C. Kenneth Bjork ABSTRACT: In forming a hollow metal shape from a billet using a porthole extrusion die, the metal of the billet flowing through the portholes is directed around bridges and the resulting streams are brought together and rejoined along a plane that extends transversely to the wall of the resulting shape at an angle of about 10° to 70° from a line extending normal to the face of the shape adjacent the resulting weld zone, thereby providing an extruded hollow shape that exhibits improved elongation and strength properties in and about the weld zone, such properties being substantially the properties of the metal apart from the weld zone. The described article is made using a porthole die in which the bridges separating the feederholes of the feederhole plate are disposed at the said angle of 10° to 70° from a plane extending normal to the face of the shape, formed in such a die, adjacent the weld zone.

Patented April 13, 1971

INVENTOR.
Karl F. Braeuninger
BY
Edward E. Schilling
ATTORNEY

Patented April 13, 1971

INVENTOR.
Karl F. Braeuninger
BY
Edward E. Schilling
ATTORNEY

SLANTED WELD EXTRUSION PROCESS

BACKGROUND OF THE INVENTION

1. Field of the Invention

The invention relates to an improved, extruded, hollow metal shape and to the method and apparatus of forming such improved hollow metal shapes. For the purpose of the specification and the appended claims, hollow extrusions such as cylindrical tube, or a shape that is, in section, e.g., oval, rectangular, trapezoidal or not a standard geometrical form, are herein referred to as a shape or a hollow shape.

2. Description of the Prior Art

It is well known that the production of hollow extrusions such as shapes of symmetrical and asymmetrical configuration by means of dies variously referred to as spider, porthole, feederhole, or bridge dies, often results in defective welds, low elongation and low strength properties in the weld zone, as a result of coarse grain structure or other undesirable metallurgical characteristics in or about the weld zone. These defects especially occur when alloys are extruded that for strength reasons are compositions containing total alloying addition greater than about 2 percent by weight of the base metal. These defects could be avoided if one could extrude these shapes from hollow billets which, in fact, can be done with simple symmetrical shapes, e.g., round, rectangular or square shapes. Unfortunately other shapes are frequently required and a porthole or feederhole die must be used and a solid billet extruded therethrough. For other reasons as well, round, rectangular or square shapes often must also be extruded through porthole dies. In such dies the metal streams passing through the portholes or feederholes rejoin within the die and become part of the different elements of the hollow shapes and each confluence of the streams of metal becomes a longitudinally extended weld in the extruded shape. Such welds extend transversely through the wall of the shape and are especially visible on polishing and appropriately etching an end of the extruded shape, e.g., etching with aqueous caustic solution.

Historically, it has been customary for die designers to design a porthole die with the bridges or ribs as short as possible in order to achieve greater strength and longer die life. The shortest bridge or rib that can be used extends at an angle of 90°, or normal, to the adjacent wall of the shape extruded through the die. Geometrical considerations may dictate construction of a bridge at an angle other than said 90°, but this is a rare exception to the general practice and even then the die designers try to stay within 10° to 15° of 90°.

OBJECTS OF THE INVENTION

It is a principal object of the invention to provide an improved, extruded, hollow metal shape having good elongation and strength properties in the weld zones in the walls of the metal shape.

It is a further object of the present invention to provide a method and an apparatus for the production of the present improved, extruded, hollow metal shape.

These and other objects and advantages of the present invention will be more clearly understood by those skilled in the art upon becoming familiar with the following description and the appended claims.

SUMMARY OF THE INVENTION

It has now been discovered that an improved extruded, hollow shape, made from a solid metal billet using a porthole die, is provided if the streams of metal being forced through the feederhole plate are rejoined into a weld zone that extends diagonally through the wall of the shape along a plane that extends from about 10° to 70° from a line extending normal to the wall of the extruded shape adjacent the weld zone.

The apparatus employed in the present process of making the said improved, extruded, hollow metal shape takes the form of a porthole die in which the bridges between the feederholes in the feederhole plate terminate in a trailing edge on the die plate side, which edge extends along a plane transverse to the wall of the shape being formed in a direction that is about 10° to 70° from a line extending normal to the face of the shape adjacent the weld zone, i.e., normal to the defining wall of the perimeter of the die opening. Preferably, the angle of the weld zone is about 20° to 50° from the normal direction.

BRIEF DESCRIPTION OF THE INVENTION

Most any of the commercially extrudable metals may be extruded according to the present method to provide the present improved article. The method is particularly applicable to alloys which contain at least 2 percent by weight of alloying addition. The method is also particularly applicable to alloys of magnesium or aluminum containing at least 70 percent by weight of the base metal.

The method and apparatus of the invention will be more fully understood on reading the following description together with the drawing in which.

Figure 2:
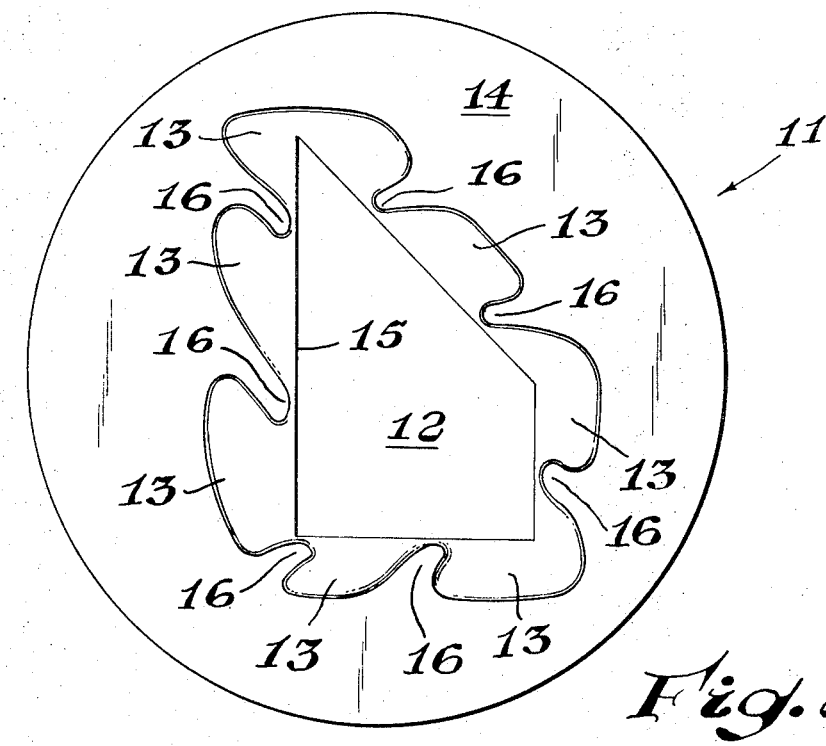
FIG. 2 is a view in front elevation of a die plate that is complementary to the feederhole plate of FIG. 1 and together with said feederhole plate, forms, in combination, a porthole or feederhole die. The side exposed in FIG. 2 is the side that faces toward, and contacts, the feederhole plate.
Figure 1:
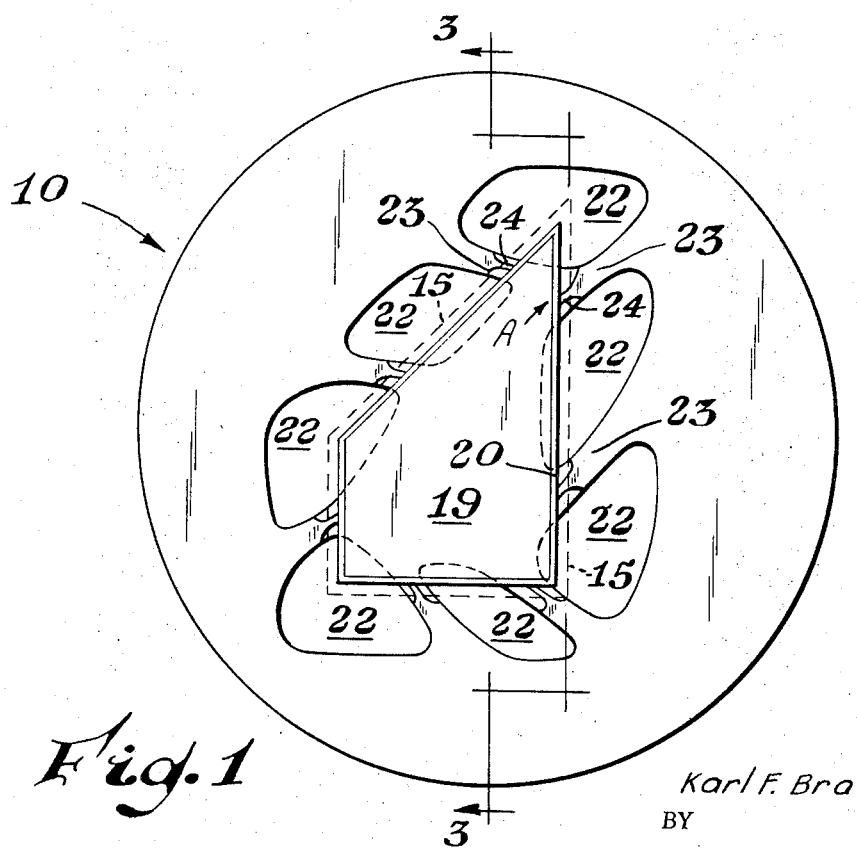
FIG. 1 is a view in front elevation of a feederhole plate portion of a composite porthole or spider die according to the invention, the side exposed being that side which carries the mandrel and faces away from the billet being forced therethrough.

The feederhole plate 10 shown in FIG. 1, as viewed from the die plate side which is away from the billet side, is designed to be used in conjunction with the die plate 11 of FIG. 2. The die plate 11 is here viewed from the feederhole plate side. The die plate 11 is a large disc-shaped piece of tool steel having a centrally formed die opening 12 surrounded by an array of bevelled-out areas 13 that slope inwardly from the face 14 of the die plate to the perimeter 15 of the die opening. The bevelled-out areas 13 are separated by pads 16 which have surfaces on the same plane as the face 14 of the die plate. The pads 16 constitute the metal remaining after the bevelled-out areas 13 are formed out of the die plate by a selective grinding operation.

Figure 3:
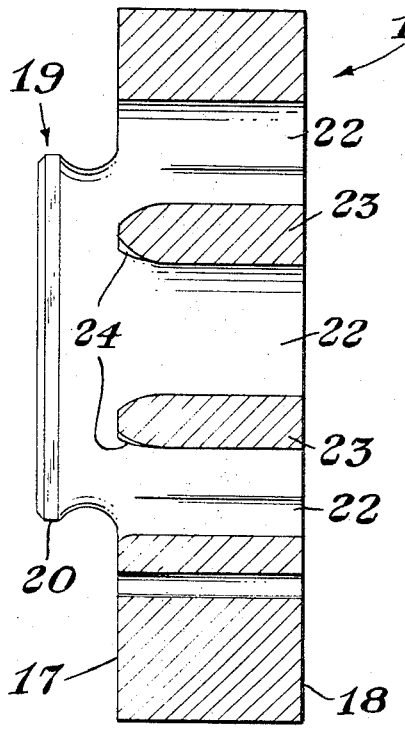
FIG. 3 is a view in vertical section taken along line 3—3 of FIG. 1 showing some of the details of construction of the feederhole plate, especially the inclined bridges between the feederholes.
Figure 4:
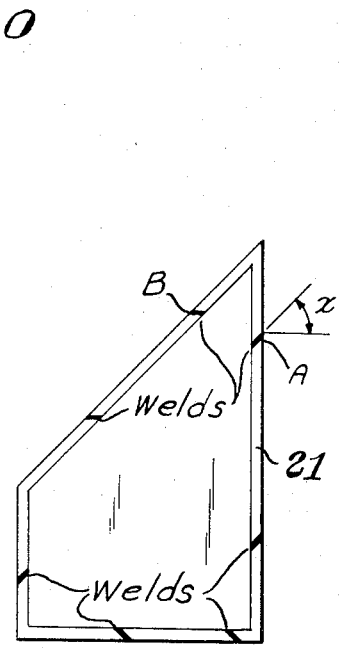
FIG. 4 is an end view of an extrusion produced using the composite die of FIGS. 1—3, showing the weld zones that appear on polishing and etching the visible edges of the extruded article.

Referring now both to FIGS. 1 and 3, the feederhole plate 10 is seen to be formed of a single disc-shaped piece of metal having a centrally disposed mandrel 19 formed of said same single piece of metal and projecting outwardly from the die plate side 17 thereof. The mandrel 19 is designed to project, barely, into the die opening 12 of the die plate 11 when the two plates are mounted juxtaposed in operative relationship. The mandrel 19 is positioned so that the spacing between the perimeter 20 of the mandrel and the perimeter 15 of the die opening, the relative position of the latter being shown in dotted outline in FIG. 1, dictates the shape, in section, assumed by extrusions formed in the composite extrusion die. In the die shown, a shape 21 is obtained as illustrated in FIG. 4.

Referring again to FIGS. 1 and 3, the mandrel 19, which is supported by the feederhole plate 10, is surrounded by a series of feederholes 22 that admit metal under pressure from the billet side 18 of the plate 10. The feederholes 22 are separated by bridges 23 that consist of the metal remaining after forming by bridges feederholes transversely through the feederhole plate 10. In the feederhole plate shown, each of the feederholes are inclined away from a line normal to the adjacent edge of the mandrel 19, and the bridges 23 therebetween are similarly inclined. It is to be understood that that which is inclined with respect to the adjacent edge of the mandrel 19 is inherently inclined in the same manner with respect to the wall of a shape formed by extrusion through such a die. As is seen in FIG. 3, the trailing edges 24 of bridges 23 are generally inclined in substantially the same plane as the bridges themselves, and it is really the disposition of these trailing edges which is determinative of the angle of the weld obtained. The plane, along which the inclined trailing edges 24 extend, forms an angle in the range of about 10° to 70° with a line extending normal to the perimeter of the mandrel 19 adjacent the said trailing edge 24, and more preferably, such angle is in the range of about 20° to 50°.

If desired, in any given porthole die where other reasons may dictate the preparation of an extruded shape with mainly conventionally transversely extending weld zones, improvement according to the present invention is obtained weld by weld, wherein the apparatus is made with an inclined bridge so as to form at least one slanted weld in the finished extrusion. Ordinarily it would be highly desirable to make each weld zone a slanted weld by the employment of inclined bridges and feederholes throughout the feederhole plate.

Figure 5:
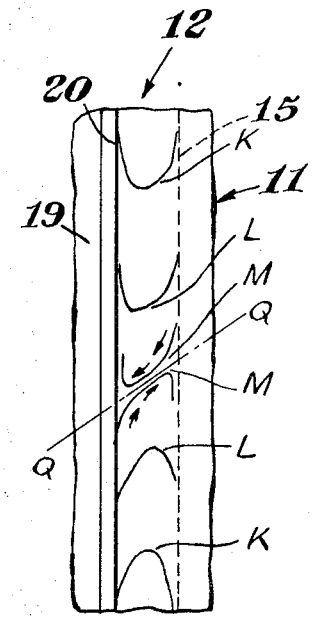
FIG. 5 is an enlarged fragmentary portion of the view in FIG. 1 taken from the area generally indicated by the letter A in FIG. 1.

The method of the invention is not entirely understood, but it is believed that the use of the inclined feederholes and bridges in the apparatus of the present invention results in greater slippage and/or working between the conjoining streams of metal flowing around either side of each bridge resulting in weld zones that exhibit considerably improved elongation and strength properties. The hypothesized metal flow will be better understood with reference to the illustrative view of FIG. 5 in which there is shown an enlarged fragmentary portion of FIG. 1 taken from the area in FIG. 1 indicated generally by the letter A, and further, showing expected metal flow through the space between the perimeter 20 of the mandrel 19 and the perimeter 15 of the die opening 12. Lightly drawn looping lines K, L and M designate the coordinate approach of theoretically preselected and identified metal portions at successive time intervals, the metal meeting along line Q–Q immediately adjacent to and aligned with the trailing edge 24 of a bridge that is not visible in this view, the bridge being covered by the metal. Because of the slant of the trailing edge of the bridge, the metal streams meeting at Q–Q apparently undergo some differential movement along Q–Q as indicated by the arrows, resulting in a substantial improvement in the quality of weld obtained.

The slanted welds obtained according to the invention show very little formation of coarse grain structure, are very narrow, and do not show much difference, on micrographic examination, from the unwelded material surrounding the weld and thus a quasi-seamless hollow shape is obtained.

The principle of the present invention is as applicable to the production of hollow shapes of round or oval section as to other geometrical configurations and the desired angle of weld is to be understood in such cases to be measured with reference to a tangential line drawn to the curved surface and contacting the surface at the location of the weld. For the purpose of the present description and the appended claims, a line or plane normal to such tangential line is normal to the wall of the shape.

Figure 6:
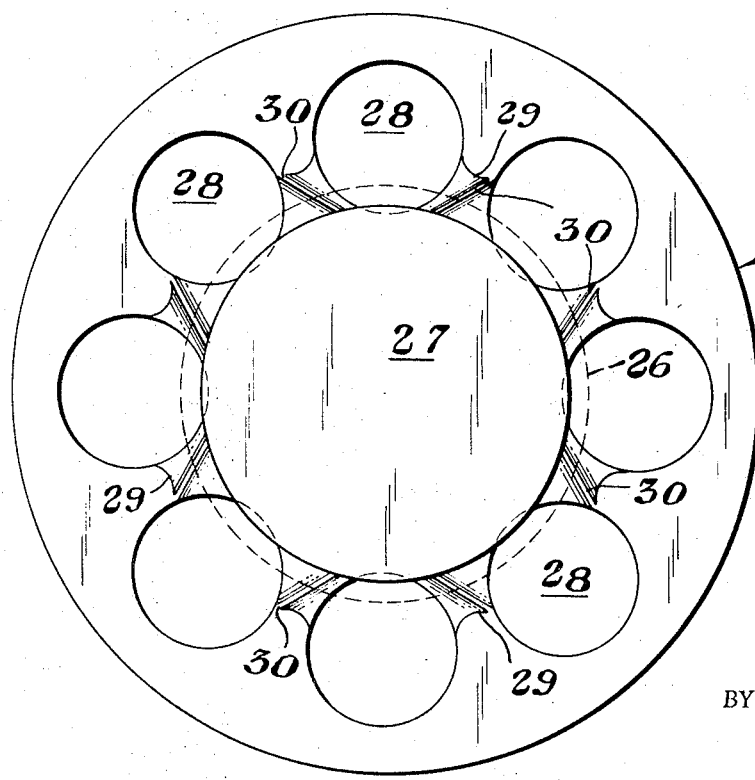
FIG. 6 is a view in front elevation of a feederhole plate for the extrusion of a round tube, according to the invention, with the corresponding die opening in the complementary die plate shown in dotted outline around the mandrel.

A suitable feederhole plate 25 for a composite die constructed according to the invention for the extrusion of a cylindrical tube is shown in FIG. 6, the perimeter 26 of the complementary die opening in the corresponding die plate (not shown) being depicted in dotted outline around the mandrel 27. The feederholes 28 are separated laterally by bridges 29 that are ground or otherwise shaped to provide trailing edges 30 that are respectively inclined at an angle of about 45° to the respective tangential lines where the trailing edges 30 "cut" the circles of die opening 26 and mandrel 27. Notably, each of the trailing edges 30 are disposed at a different angle than the bridges 29 from which they depend.

EXAMPLE

As an example of the beneficial use of the slant bridge design of the present invention an extrusion die similar to the one shown in FIGS. 1—3 was employed to make a hollow extruded shape like that shown in FIG. 4, except that all the feederholes and bridges were conventionally positioned with respect to the edge of the mandrel except the bridge and adjacent feederholes giving rise to the weld identified by the letter A in FIG. 4. The rest of the feederholes and bridges extended substantially normal to the immediately adjacent perimeter of the mandrel and thus were perpendicularly transverse to the wall of the extruded shape itself. An extrusion was carried out with such experimental apparatus using solid billets of aluminum alloy having the Aluminum Association designation 7005. Billets 16 inches in diameter and 40 inches long were preheated to a temperature of 860° F. and placed in the container of the press and extruded at a rate of 10 feet per minute while the container was at a temperature of about 850° F. The extrude was cooled by an air quench as it emerged from the die, stretched, natural aged, and artificially aged in two steps by heating at 195° F. for 8 hours and then at 300° F. for 8 hours. Sections were then cut from the extrusion and test bars were cut from the sections that included, respectively, the slanted weld zone at point A, as shown in FIG. 4, and a directly transverse weld zone located in the same relative position as the weld at point B, in FIG. 4. The test bars were subjected to testing to determine elongation and ultimate tensile strength properties. The location of the section in the extrusion, the percent elongation and the ultimate tensile strength values determined are listed in the following table.

TABLE I

| Section location, distance from nose | Weld A | | Weld B | |
| --- | --- | --- | --- | --- |
| | percent E [1] | UTS [2] | percent E [1] | UTS [2] |
| 0 | (3) | (3) | 2.5 | 53,700 |
| 6" | (3) | (3) | 1.5 | 51,200 |
| 1' | (3) | (3) | 3.0 | 53,100 |
| 2' | 9.5 | 57,600 | 2.0 | 51,800 |
| 3' | 9.5 | 59,800 | 2.0 | 51,300 |
| 4' | 10.5 | 57,700 | 2.0 | 51,500 |
| 5' | 11.0 | 57,800 | 3.0 | 53,900 |
| 10' | 9.5 | 57,700 | 5.5 | 54,000 |
| 15' | 9.5 | 57,400 | 6.0 | 54,600 |
| 20' | 9.0 | 57,300 | 5.0 | 54,200 |
| 25' | 9.5 | 57,000 | 5.0 | 54,600 |
| 30' | 6.5 | 56,700 | 5.0 | 53,600 |
| 35' | 8.5 | 56,400 | 5.0 | 53,200 |
| 40' | 9.0 | 53,100 | 5.0 | 50,900 |

[1] Percent elongation in two inches.
[2] Ultimate tensile strength in p.s.i.
[3] Broke outside of weld.

The foregoing test results indicate the very substantial improvement in elongation and strength properties of the weld in an extruded hollow shape on forming the weld at an angle to the wall of the shape.

The article, method and apparatus of the invention having been thus fully described, various modifications thereof will at once be apparent to those skilled in the art and the scope of the invention is to be considered limited only by the breadth of the claims hereafter appended.

I claim:

1. Apparatus for extruding a hollow shape from a metal billet which comprises:
   1. a die plate having a die opening defining a longitudinal axis in the direction of metal flow; and
   2. a complementary feederhole plate carrying a mandrel adapted to extend into the die opening when the die plate and the feederhole plate are juxtaposed in operative relationship in an extrusion press, the perimeter of the said mandrel and the perimeter of the die opening being therein spaced apart to define the walls of a hollow metal shape extruded through the die, said feederhole plate and mandrel being formed together of a single piece of metal, said feederhole plate having feederholes extending transversely therethrough in an array around the mandrel, the feederholes being separated by bridges, at least one of said bridges extending in a nonradial direction with respect to the longitudinal axis of the die opening and further at an angle of between 10° and 70° from a line extending normal to the defining walls of the adjacent portion of die opening.

2. The apparatus as in claim 1 in which at least one of the said bridges extends across the said spacing at an angle of between 20° and 50° with respect to a line extending normal to the defining walls of the adjacent portion of die opening.

3. The apparatus as in claim 1 in which the bridges have trailing edge portions and said trailing edge portions are disposed at said angle between 10° and 70° and the remaining portions of the bridges are disposed at a substantially different angle.